US010885123B2

(12) United States Patent
Crawford et al.

(10) Patent No.: US 10,885,123 B2
(45) Date of Patent: Jan. 5, 2021

(54) APPARATUS, SYSTEMS, AND METHODS FOR PROVIDING THREE-DIMENSIONAL INSTRUCTION MANUALS IN A SIMPLIFIED MANNER

(71) Applicant: The Parari Group, LLC, Hampton, VA (US)

(72) Inventors: James T. Crawford, Yorktown, VA (US); Andrew Tietz, Mahomet, IL (US)

(73) Assignee: THE PARARI GROUP, LLC, Hampton, VA (US)

( * ) Notice: Subject to any disclaimer, the term of this patent is extended or adjusted under 35 U.S.C. 154(b) by 0 days.

(21) Appl. No.: 16/750,935

(22) Filed: Jan. 23, 2020

(65) Prior Publication Data

US 2020/0218768 A1 Jul. 9, 2020

Related U.S. Application Data

(63) Continuation of application No. 15/561,909, filed as application No. PCT/US2016/024479 on Mar. 28, 2016, now Pat. No. 10,585,949.

(Continued)

(51) Int. Cl.
*G06F 16/93* (2019.01)
*G06F 7/00* (2006.01)
(Continued)

(52) U.S. Cl.
CPC ............... *G06F 16/93* (2019.01); *G06F 7/00* (2013.01); *G06F 16/00* (2019.01);
(Continued)

(58) Field of Classification Search
CPC ................................ G06F 16/93; G06F 16/00
See application file for complete search history.

(56) References Cited

U.S. PATENT DOCUMENTS 8,386,962 B2 * 2/2013 Geesey ............... G06F 30/15
715/851
2007/0043709 A1 2/2007 Strassmann
(Continued)

FOREIGN PATENT DOCUMENTS

EP 2544103 A1 1/2013

OTHER PUBLICATIONS

Supplementary European Search Report issued in European Application No. 16773912.7 dated Oct. 25, 2018, 11 pages.
(Continued)

*Primary Examiner* — Edward Martello
(74) *Attorney, Agent, or Firm* — Joshua B. Brady; Nixon & Vanderhye, P.C.

(57) ABSTRACT

Interactive, electronic guides for an object may include one or more 3D models, and one or more associated tasks, such as how to assemble, operate, or repair an aspect of the object. A user electronic device may scan an encoded tag on the object, and transmit the scan data to an electronic guide distribution server. The server may receive an electronic guide generated by an electronic guide generator having a 3D model repository and a task repository, the guide associated with the encoded tag. Guide managers may add or modify 3D models and/or tasks to broaden the available guides, and tag producers may generate encoded tags using new and/or modified 3D models and tasks and apply tags to objects.

20 Claims, 5 Drawing Sheets

Related U.S. Application Data

(60) Provisional application No. 62/139,351, filed on Mar. 27, 2015.

(51) Int. Cl.
  *G06K 9/00* (2006.01)
  *G06F 16/00* (2019.01)
  *G06K 9/36* (2006.01)
  *G06K 7/10* (2006.01)

(52) U.S. Cl.
  CPC ..... *G06K 7/10237* (2013.01); *G06K 9/00214* (2013.01); *G06K 9/36* (2013.01)

(56) References Cited

U.S. PATENT DOCUMENTS

| | | | |
|---|---|---|---|
| 2009/0193028 A1 | 7/2009 | Kaplan | |
| 2009/0281993 A1 | 11/2009 | Hadley et al. | |
| 2009/0322671 A1* | 12/2009 | Scott | G06F 3/012 345/156 |
| 2012/0116728 A1* | 5/2012 | Shear | G06T 19/006 703/1 |
| 2013/0270341 A1* | 10/2013 | Janneh | G06F 16/00 235/383 |
| 2013/0320086 A1 | 12/2013 | Kruglick et al. | |
| 2014/0204190 A1* | 7/2014 | Rosenblatt, III | H04N 7/14 348/77 |
| 2014/0285522 A1* | 9/2014 | Kim | G06Q 30/0601 345/633 |
| 2014/0310595 A1* | 10/2014 | Acharya | G06T 11/00 715/706 |
| 2015/0185825 A1* | 7/2015 | Mullins | G06F 3/048 345/633 |
| 2016/0171775 A1* | 6/2016 | Todeschini | G06T 11/60 345/633 |
| 2016/0247324 A1* | 8/2016 | Mullins | G02B 27/0179 |
| 2016/0291922 A1* | 10/2016 | Montgomerie | G06F 3/1462 |
| 2017/0364162 A1* | 12/2017 | Fujimaki | G06F 3/011 |

OTHER PUBLICATIONS

International Search Report and Written Opinion dated Jun. 17, 2016 in International Application PCT/US2016/024479 filed Mar. 28, 2016.

* cited by examiner

APPARATUS, SYSTEMS, AND METHODS FOR PROVIDING THREE-DIMENSIONAL INSTRUCTION MANUALS IN A SIMPLIFIED MANNER

CROSS REFERENCE TO RELATED APPLICATIONS

This application is a Continuation of U.S. application Ser. No. 15/561,909, filed Sep. 26, 2017 which is a 371 National Stage of PCT International Application No. PCT/US2016/024479, filed Mar. 28, 2016, which claims the benefit of U.S. Provisional Application No. 62/139,351, filed Mar. 27, 2015, the contents of both of these applications are incorporated by reference in their entirety.

STATEMENT REGARDING GOVERNMENT SUPPORT

None.

FIELD OF THE INVENTION

The present disclosure relates to applications, systems, and methods for generating and providing object guides, such as three-dimensional product instruction manuals, in response to a scan of an object.

BACKGROUND INTRODUCTION

Electronic devices are capable of running applications (or "apps") that may electronically display different types of guides pertaining to the operation, repair, or assembly of various physical objects. Users may have need for these interactive electronic guides while using or working on these objects. Although numerous printed and electronic interactive guides are available, finding a particular guide—such as a guide for the repair of a specific part of a mechanical device—can be onerous at times, and nearly impossible at others. For example, locating a guide for an object, such as a lawn mower, purchased long ago or no longer supported by the manufacturer, may be difficult and burdensome, especially if the lawn mower broke down during the middle of mowing a yard. Further, many guides are difficult to use, and provide little (if any) assistance with one or more specific tasks. Such complexity frequently increases the difficulty and the overall time needed to locate, receive, and use an interactive guide, especially at the point of need, diminishing the user's ability to operate, repair, or assembly an object. Additionally, the ability to collect useful data relating to the use of a guide, for improving the content and effectiveness of the guide, is limited to voluntary user feedback. Manufacturers therefore have limited means to determine how to enhance the usefulness of a guide for users.

BRIEF SUMMARY

Apparatus, systems, and methods for providing guides based on electronic scanning of objects are disclosed. In some embodiments, a user may use an electronic device, such as a mobile phone with a camera or other sensor, to scan all or a portion of an object, packaging for the object, or material associated with the object. The scan may produce scan data. The device may include an app configured to use the scan data to locate and receive from a remote source, a guide related to the object, such as a maintenance or repair guide.

In some embodiments of the present approach, a user may scan an object, request a guide for the object, and access and/or use the interactive guide for the object. The use may use an electronic device such as, for example, a mobile electronic device like a smart phone, to scan and receive scan data. In some embodiments, the electronic device may include an app through which a user may scan an object, request an interactive guide for the object, and/or access and/or use the interactive guide for the object. One or more devices may be used to scan, request, and access, in various combinations. For example, a mobile phone may be used to scan an object and request a guide, and a separate projector system may receive and display the guide. As another example, a handheld scanner may send scan data to a mobile device, and the mobile device then receives a guide viewable on a monitor connected to the mobile device.

Under the present approach, a number of scanning techniques may be used to generate scan data. For example, in some embodiments, an electronic device may utilize near field communication (NFC) between itself and an NFC-enabled object. Other forms of wireless signal transmission and receipt may be used, such as Bluetooth and RFID. Additionally an electronic device may use optical scanning techniques, such as using a built-in camera or other optical sensors, to scan all or a portion of an object. For example, a visual scan of an identifying mark on an object, such as, but not limited to, a bar code, a QR code, or symbols on a model number panel, may be used in some embodiments. In some embodiments, an image of all or a portion of an object itself may be scanned, and the image used to identify the appropriate guide.

Under the present approach, a number of techniques may be used to identify the appropriate guide(s) or portion(s) of guide(s) to deliver. In some embodiments, the electronic device determines the appropriate guide, such as through an app having access to the scan data. In some embodiments, the app may receive or analyze the scan data and compare to a database to determine the guide to request. For example, in some embodiments, an electronic device (or an app running on the electronic device) may identify the target object, then request an interactive guide from a guide source, such as a cloud-based repository. The electronic device then receives and displays the guide to the user. In some embodiments, a remote device, such as a server or database, determines the appropriate guide after receiving all or a portion of the scan data from the electronic device. For example, an electronic device may transmit scan data to a remote device operated by the app provider, guide provider, object manufacturer, or another third party. The remote device may analyze the scan data to identify one or more guides to transmit. In some embodiments, the electronic device may receive a list of available guides. In some embodiments, the electronic device may receive one or more suggested guides.

The present approach is not limited to a type of guide. There are many forms of product guides, ranging from paper-based guides to electronic guides, and static guides to interactive and smart guides. Under the present approach, a user may receive one or more guides of any variety. In some embodiments, a guide may be generated or modified in response to a scan data, to maximize the usefulness to the user.

In some embodiments, use of the guide may be monitored in a manner to generate useful data about use of the guide and the guide itself. Useful data may include, for example, the time a user spends on a certain aspect of a guide, the number of times a user repeats or replays an aspect of a guide, the frequency of using a guide, and so on. Such data may be used to refine or improve aspects of the guide, such as improving the description of a particular aspect or improving an explanation or step, such that the usefulness and effectiveness of the guide may improve over time. Embodiments may include feedback mechanisms for users to provide feedback on a guide, such as the usefulness of an aspect of a guide, the need to include an additional topic or clarify a step, or other suggestions.

Embodiments of the present approach may take the form of a system for disseminating electronic guides. The system may include an electronic guide generator having (1) a 3D model repository with a plurality of 3D models, each 3D model associated with an encoded tag, and (2) a task repository having a plurality of tasks, each task associated with an encoded tag. The system may also include a plurality of user electronic devices, each user electronic device having (1) a scanner configured to scan an encoded tag on an object to generate a scan data including data associated with the encoded tag, (2) a scan data transmitter configured to transmit scan data, (3) an electronic guide receiver configured to receive an electronic guide, and (4) a display configured to display the received electronic guide. In some embodiments, the user electronic device may be configured to transmit usage data, usage data comprising data relating to the use of an electronic guide. The system may also include an electronic guide distribution server in electronic communication with the electronic guide generator and the plurality of user electronic devices, and configured to (1) receive a scan data from a user electronic device, (transmit the scan data to the electronic guide generator, (3) receive an electronic guide from the electronic guide generator, the electronic guide associated with the scan data, and (4) transmit the electronic guide to a user electronic device.

In some embodiments, the electronic guide comprises at least one 3D model and at least one task associated with the scan data. The 3D model may show all or a portion of an object. The tasks may relate to instructions or guidance for operating, assembling, and/or repairing all or a portion of the object. For example, a task may comprise at least one instructional sequence relating to an aspect of an object, and the at least one instructional sequence is associated with at least one 3D model. The encoded tag in some embodiments may correspond to an aspect of the scanned object, and the electronic guide comprises at least one a 3D model and a task associated with the aspect of the scanned object.

In some embodiments, the system may include at least one electronic guide manager, the at least one electronic guide manager in communication with the electronic guide generator and configured to at least one of add a new 3D model to the electronic guide generator, modify an existing 3D model in the electronic guide generator, add a new task to the electronic guide generator, and modify an existing task in the electronic guide generator.

Some embodiments may include at least one encoded tag producer. The at least one encoded tag producer may be configured to receive an encoded tag order and generate one or more new encoded tags associated with one or more 3D models and one or more tasks. The encoded tag producer may be configured to apply a new encoded tag to an object. The encoded tag producer may be configured to generate one or more new encoded tags associated with an aspect of an object and one or more 3D models and one or more tasks, the one or more 3D models and one or more tasks associated with the aspect of the object.

In some embodiments the 3D model repository may have 3D model object data, and the electronic guide distribution server may be configured to (1) convert the 3D model object data into a delivery format, and (2) transmit the 3D model delivery format to the user electronic device.

Some embodiments of the present approach may take the form of a process. For example, a process for disseminating electronic guides may involve receiving, at an electronic guide distribution server, an electronic guide request from a user electronic device, the electronic guide request including a scan data of an object, the scan data including data associated with an encoded tag; generating, at an electronic guide generator, an electronic guide for the object based on the data associated with the encoded tag, the electronic guide comprising at least one 3D model and at least one task associated with the object; and transmitting the electronic guide to the user electronic device.

In some embodiments, the at least one 3D model may be selected from a 3D model repository with a plurality of 3D models, each 3D model associated with an encoded tag; and the at least one task may be selected from a task repository having a plurality of tasks, each task associated with an encoded tag. Some embodiments may include receiving from the user electronic device usage data comprising data relating to the use of an electronic guide. Some embodiments include receiving, at the electronic guide generator, at least one of a new 3D model and a new task, from an electronic guide manager, and updating at least one of the 3D model repository and the task repository.

In some embodiments, the scan data may include data associated with an aspect of the object, and the electronic guide is associated with the aspect of the object. In some embodiments, the process may include (1) retrieving object data from at least one of the 3D model repository and the task repository, the object data including 3D model data and task data, and (2) converting the object data into a delivery format for transmission to the user electronic device. Generating the electronic guide for the object may include, for some embodiments, identifying at least one 3D model in a 3D model repository associated with the data associated with the encoded tag; identifying at least one task in a task repository associated with the data associated with the encoded tag; and combining the at least one 3D model and the at least one task to form an electronic guide associated with the object.

Embodiments of the present approach may also take the form of a system for generating electronic guides. The system may include an electronic guide generator having (1) a 3D model repository with a plurality of 3D models, each 3D model associated with an encoded tag, and (2) a task repository having a plurality of tasks, each task associated with an encoded tag; an electronic guide distribution server configured to (1) receive a scan data from a user electronic device, (2) transmit the scan data to the electronic guide generator, (3) receive an electronic guide from the electronic guide generator, the electronic guide associated with the scan data, and (4) transmit the electronic guide to a user electronic device; and an encoded tag producer configured to receive an encoded tag order and generate a new encoded tag associated with one or more 3D models and one or more tasks.

An electronic guide manager in some embodiments may be configured to at least one of add a new 3D model to the electronic guide generator, modify an existing 3D model in the electronic guide generator, add a new task to the electronic guide generator, and modify an existing task in the electronic guide generator. In some embodiments, the electronic guide manager is configured to issue a new encoded tag order to the encoded tag producer, the new encoded tag order associated with at least one of add a new 3D model, a modified existing 3D model, a new task, and a modified existing task.

These and other features will become apparent in view of the drawings appended hereto and the description and claims that follow.

DESCRIPTION

Figure 1:
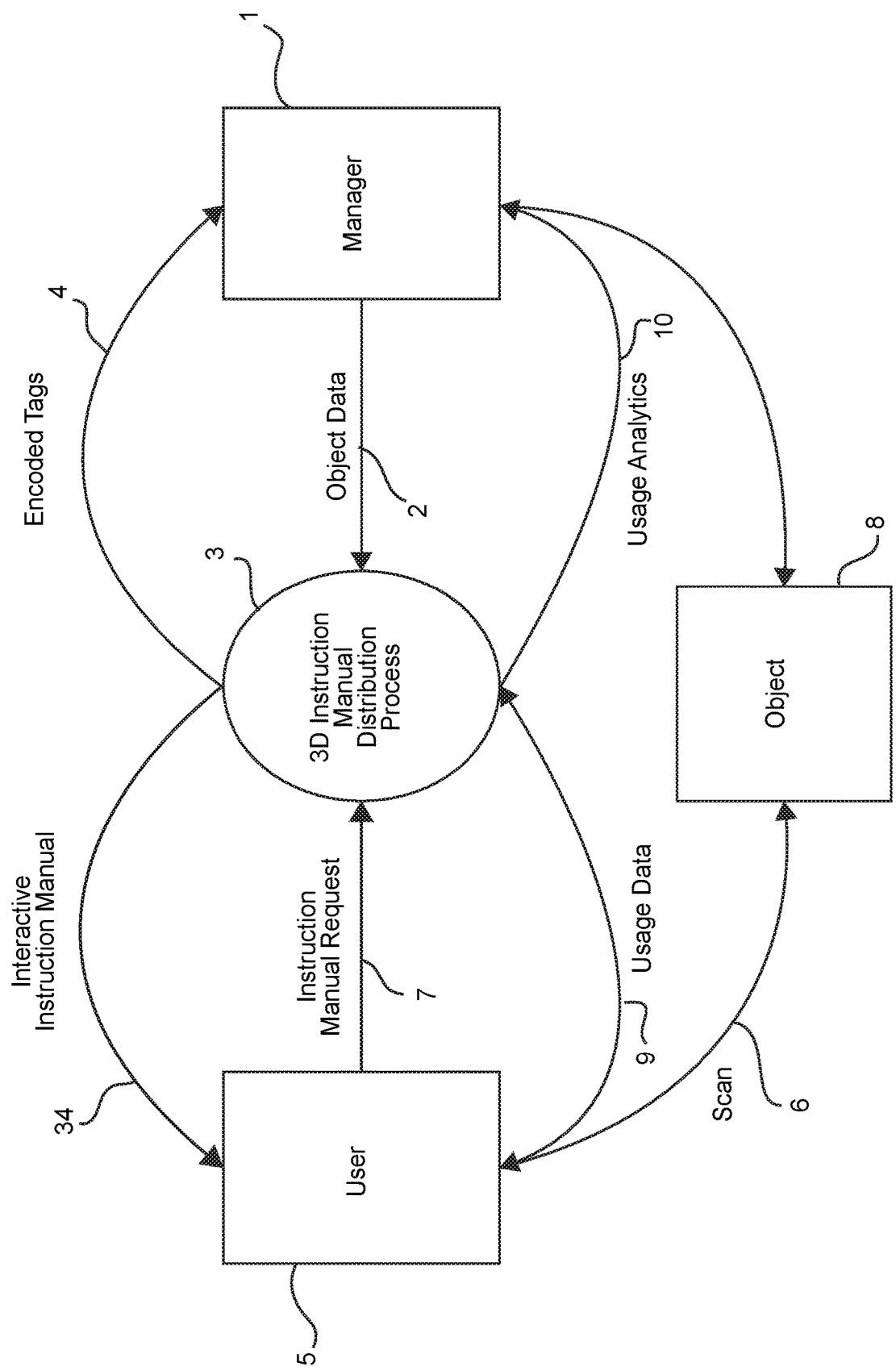
FIG. 1 is a schematic showing the contextual flow of data in an embodiment of the present approach.

Many people use guides for various objects ranging from lawn mowers to wireless routers, but accessing and using these guides effectively at the point of need may be onerous. For example, a user may need to know how to change a tire on a car. By employing embodiments of the apparatus, systems, and/or methods described herein, the user may simply scan the tire that needs to be changed using, for example, a mobile phone, and receive an interactive 3D3D guide for the specific car and having a step-by-step instructions for changing the tire. In some embodiments, the interactive 3D guide may be synchronized to the user's live view, greatly increasing the effectiveness of the instruction guide. For example, a user may position a mobile device camera facing the tire in the previous example, and the 3D guide may superimpose over the tire as seen from a viewing screen on the mobile device. In some embodiments, the synchronized guide may indicate locations of aspects of the object, such as lug nuts and where to safely position a car jack.

The apparatus, systems, and methods described herein may be applied in numerous scenarios, and across several industries. For example, a user may want a detailed view of the interior of a real estate property. Currently a user may be able to view images on a website and schedule a live appointment to walk through the property. However, using an embodiment of the present approach, a simple sales sheet can be scanned and a comprehensive and immersive 3D view of the property can be sent to the user's electronic device, allowing the user to virtually walk through the property from a remote location.

As another example, embodiments of the apparatus, systems, and/or methods described herein may be used by a user who has purchased a piece of furniture that requires assembly. Typically, the user would follow a paper-based manual to assemble the item. Such manuals frequently include inadequate explanations of steps and line drawings that are hard to understand, complicating the process of assembling the furniture. However, by using embodiments of the apparatus, systems, and/or methods described herein, the user may scan the furniture packaging (or another aspect of the item), and receive an interactive 3D guide for the assembly of the item. In some embodiments, that the interactive guide can be aligned with the user's view of the unassembled item and provide live assembly instructions, greatly enhancing user's ability to assemble the item.

In the embodiments described herein, the "user" generally refers to the individual or entity (e.g., multiple people) seeking a guide for an object. As indicated above, the "object" may be any item for which one or more guides may be available, and can include, for example and with no intention of limiting the scope of this disclosure, mechanical devices and tools, electronic devices and tools, automobiles, furniture, properties, etc. Although many of the exemplar embodiments described herein are for physical objects, the object may be a portion of a computer program or software application, such as a particular screen, for which a user requires assistance completing a task or solving a problem. Generally, an "electronic device" may be any device capable of scanning an object, an aspect of an object (such as a bar code, QR code, or part of an object) an item associated with an object (e.g., packaging, invoice, receipt, marketing material, etc.). In some embodiments, the electronic device may be capable of transmitting scan data, or other data based on scan data, to server or other component. For example, in some embodiments, the electronic device may be configured to analyze the scan data and determine the guide(s) and/or portions of guide(s) that the user should receive. The "scan data" may be any data received from the scan, and may depend on the type of scan. Non-limiting examples of scan data include any of, or a combination of, imagery, bar code or QR code data, RFID data, symbols, etc.

A "guide" may be a collection of data describing one or more features of an object, such as how use, repair, and/or assemble the object or a portion of the object. The present approach is not intended to be limited to a type of guide. There are many forms of product guides, ranging from paper-based guides to electronic guides, and static guides to interactive and smart guides. Under the present approach, a user may receive one or more guides of any variety. In some embodiments, a guide may be generated or modified in response to a scan data, to maximize the usefulness to the user. For example, some embodiments may analyze the scan data, identify the object and one or more specific aspects of that object, then generate and deliver an interactive guide providing a 3D visualization of the object or aspect(s), along with additional audio and/or visual information related to the generated guide determined to be relevant to the scan data.

In some embodiments, a system may feature an object, one or more guides for the object, a device scanning an aspect of the object, a device requesting one or more guides for the object, a device providing one or more guides in response to a request, a device receiving and displaying the guide(s), and various request and usage data. A guide for an object may include a 3D model of the object and correlated instructional content (or other information related to the object). The system may also feature an electronic device capable of scanning an aspect of the object (such as, for example only, a part of the object itself, packaging for the object, or other material relating to the object). The system may include one or more devices to identify the object from the scan data, identify the appropriate guide(s), and display the guide. Those devices may be the same electronic device that scans the object, or more than one device sharing data.

Displaying the guide may include displaying the 3D object model and correlated instructional content as an interactive presentation to the user.

The 3D model of the object may take several forms, but generally will be a digitized version of all or a portion of the object that can be viewed from more than one perspective. The model can be, for example, a single triangulated mesh structure of the object, a model of each individual component and subcomponent that make up the object or a portion thereof, such as a CAD or engineering model, or various 3D images prepared using various animation and/or graphics techniques. In some embodiments, the guide may include instructional content. Instructional content may include, for example, step-by-step instruction(s) or other information relating to all or a portion of the object. The instructional content may be correlated with defined states of the 3D model or other imagery used in a guide. For example, a state of the 3D model can be a specific viewpoint of the 3D model and/or an assembly state of the model, and one or more steps or other information may be presented in view of the particular viewpoint or assembly state. Information may be presented visually, such as text and or other symbols or images, audibly, and combinations thereof. In some embodiments, information may be provided through feedback by an electronic device. For example, in an embodiment in which a model is superimposed over a live view, the electronic device may vibrate if a user attempts to manipulate an incorrect component. The device may use different forms of feedback, such as different sounds and/or different vibrational patterns.

Embodiments may generate, store, and distribute guides in one or more manners. Some embodiments use a web-based management application that allows a manager to create and maintain a guide. For example, a manager may use an application to prepare instructional content, and correlate the content with object imagery, such as a 3D object model. In embodiments, a manager may upload a guide through an application. One or more central servers may be used to host guides. In some embodiments, guides may be hosted on distributed servers, such as servers operated by or for the manufacturer of an object. An application may communicate with the server to request a guide, and the server may transmit a guide in response to the request. In some embodiments, the request may include additional data. The additional data may be used for one or more purposes, such as to pinpoint a portion of a guide, determine which guide(s) should be provided, and to generate a specific guide, for example.

Under the present approach, a user receives one or more guides in response to a request and/or transmission of scan data. In some embodiments, the device used to scan an object and transmit the scan data may be a mobile electronic device, such as a mobile phone or PDA. The scan may utilize one or more embedded electronic tags or physical depth scanning to identify the object (or portion of the object or material associated with the object) being scanned. The scan produces scan data. The particular scan data will depend on the method of scanning. In some embodiments, object-specific data files relating to one or more guides (such as, for example, 3D model plus instructional data) are downloaded and then displayed for the user in response to the transmission of the scan data or request for a guide In some embodiments, the guide may be displayed as interactive 3D views that may be manipulated directly on the device. In some embodiments, aspects of the guide, such as a 3D model, may be manipulated through the use of augmented reality views. In some embodiments, the 3D model may be directly overlaid onto a live view of the object. By using a 3D model for the basis of a guide, instead of static or predefined images of the object, the same data may support a wide range of viewing modalities. Thus, embodiments of the present approach may be adapted for use with a wide variety of electronic devices and display capabilities.

Turning to a description of the embodiments shown in the drawings, FIG. 1 shows a schematic of the overall contextual data flow in one embodiment of the present approach. In this embodiment, the process generally connects a user 5 with a manager 1. The manager 1 may be, for example, a provider of a guide, including, for example, one or more 3D models of an object and related instructional or procedural data. In some embodiments, manager 1 may be a party responsible for satisfying requests for guides for one or more objects. In some embodiments, manager 1 may be the manufacturer or retailer of an object. The user may be the user of the object seeking a guide. The manager 1 provides object data 2 to the 3D instructional manual distribution process 3. In some embodiments, the process may be operated by the manager. The manager may operate the process on a manager-owned and/or manager-operated server system, or alternatively using a third-party server system such as a central server system. In some embodiments, the process may be operated by a third party, such as an intermediary. The intermediary may operate a central sewer system to run all or a portion of process 3. In some embodiments, portions of process 3 may be performed separately. For example, manager 1 may perform a portion of process 3, and an intermediary may perform a portion of process 3.

In some embodiments, object data 2 includes one or more 3D models of the object (or a component thereof), and instructional sequences correlated to the 3D model. The process 3 then generates encoded tags 4 that the manager 1 can apply to one or more objects 8. An encoded tag 4 can be in a form readable from an electronic device, including but not limited to NFC chips, QR codes, or managed 3D focal points. Depending on the tag encoding used, the tags in some embodiments may be model-specific or individual item-specific. For example, model-specific tags may relate to a model number, and thus apply to any object having a model number, whereas an item-specific tag would be tied to an object serial number or to a one of a kind object.

In the embodiment shown in FIG. 1, once the tags have been encoded and integrated into the object 8, a user 5 may scan 6 the object 8) and initiate an instruction manual request 7. The user 5 then receives one or more interactive instruction manuals 8. In some embodiments, during the use of the interactive instruction manual 8, usage data 9 is captured and provided to the manager 1 for subsequent usage and improvement analytics 10. Usage data 9 may include numerous categories of data.

Figure 2:
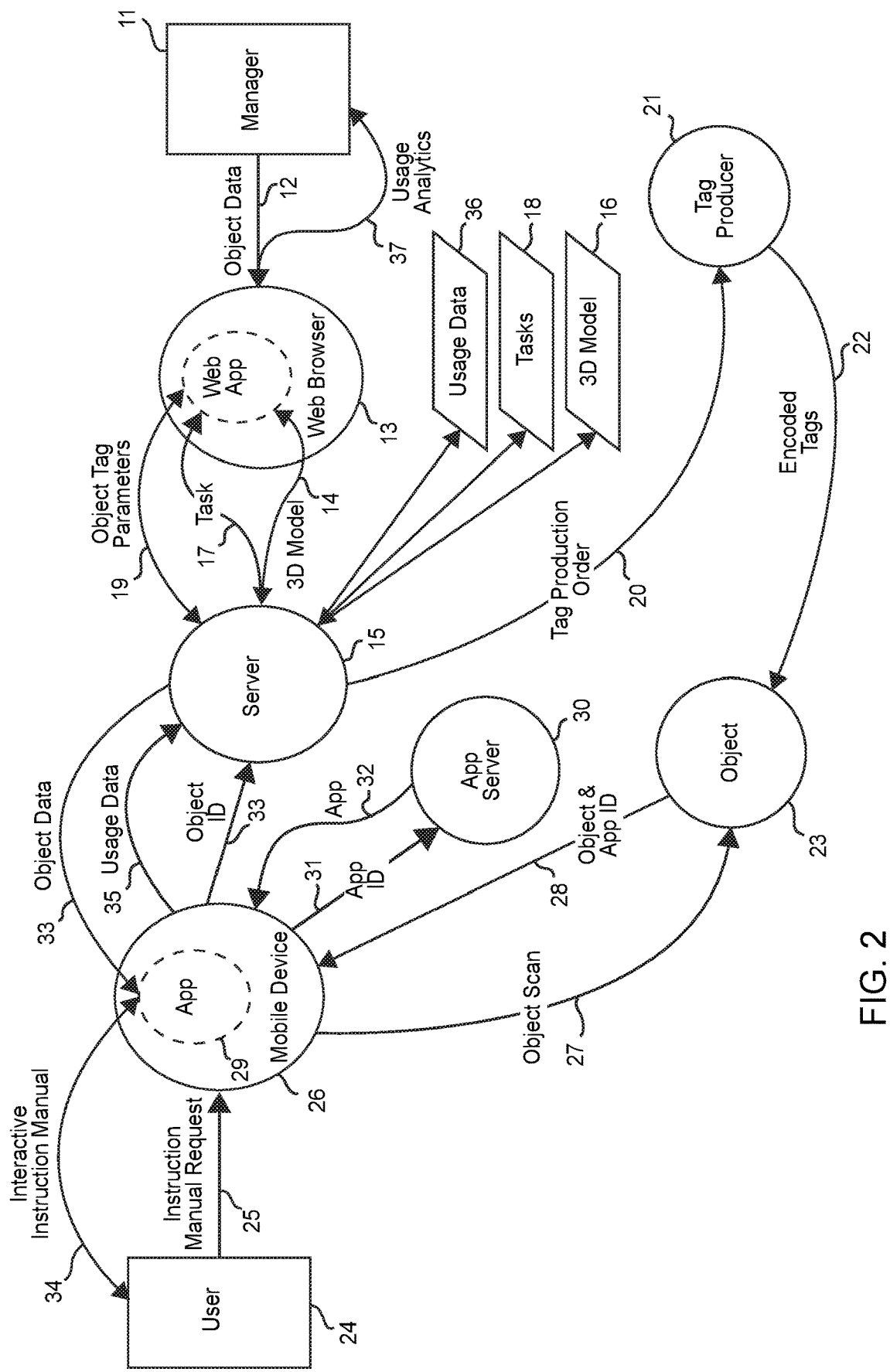
FIG. 2 is a diagram showing the physical flow of data between elements in an embodiment of the present approach.

FIG. 2 shows the physical flow of data between elements between components in an embodiment of the present approach. With respect to FIG. 2, a manager may be a party generating, maintaining, offering, and/or providing one or more guides for one or more objects. The manager 11 may upload object data. 12 to a server 15 via an electronic channel, such as web-based application 13. One of ordinary skill in the art should appreciate that other electronic channels, such as physical discs or drives, email or FTP, etc., may be used as an electronic channel in other embodiments. Web-based application 13 may be an application configured to receive information from manager 11 relating to a guide, process the information as needed to prepare a guide, and provide the guide to a server 15. In some embodiments, web application 13 may be software operating at the manager side, the server side, or both. Object data may include, for example, 3D models of the object in whole or at various levels sub-assemblies, wiring data, internal structure connections along with specific techniques, tactics, and procedures (TTPs) pursuant to operation, maintenance, or assembly of the object. It should be appreciated that the specific content of object data may depend on the type of guide(s), model(s), and instruction or other content. In some embodiments, for example, the object data may include three-dimensional imagery at the resolution and detail required by the associated TTPs. One of ordinary skill in the art should appreciate that object data may depend on the type of guide being provided, and may vary from one guide to the next. A 3D model 14 may be uploaded to the server 15 and, if desired, converted for online data storage 16. For example, in some embodiments, raw object data may be converted into another form for optimal streaming and viewing across web enabled applications. The 3D model 14 may be part of object data 12 uploaded by manager 11. In some embodiments, web application 13 may generate a 3D model based on data included in object data 12.

In some embodiments, the guide may include tasks 17 to convey additional information to a user. Generally, a task 17 may be additional information relating to the object, such as a repair step, maintenance step, action, or other information relating to the object. A task may be information such as text, images, audio, video, etc., or combinations thereof. Tasks 17 may be uploaded as part of object data 12 and/or may be added through other interaction with web application 13. For example, in the embodiment shown in FIG. 2, the online view of the 3D model 14 may stream back through the server 15 and be presented via the web app 13 to the manager 11. The manager 11 may then add additional object data 12 by selecting various views and states of a 3D model 14 via the web application 13, and associate one or more tasks with a particular combination of view(s) and/or state(s). For example, in some embodiments, a task may be associated with one or more views and/or states of a 3D model, such that the associated views) and/or state(s) of the model are viewed in connection with the task. These selections may be sent as tasks 17 to the server 15, and stored for retrieval 18. In some embodiments, manager 11 may include tasks 17 in object data 12 transmitted to web application 13. In some embodiments, one or more tasks 17 may be transmitted directly to server 15. Once the 3D model 14 and tasks 17 are finalized, the manager 11 may add any additional object data 12 related to how the object will be tagged 19. Object tag parameters 19 transfer from the web application 13 to the server 15, and software running on the server 15 may generate a tag production order 20 for the tag producer 21. Tag producer 21 may be a process for manufacturing tags, including electronic tags and physical tags. In some embodiments, tag producer 21 may be a software module operated by manger 11 or by a third party, such as a party operating a server 15. The tag producer 21 produces one or more encoded tags 22 in response to the production order 20. In some embodiments, all or a portion of tag producer 21 may prepare physical tags in response to a tag production order 20. In some embodiments, tag producer 21 may prepare a tag production order 20 specifying the parameters for a tag, and the manufacture of a tag may be performed by a third party in response to the tag production order 20. In some embodiments, a tag production order 20 may call for the production of a 3D scan tag. An encoded tag 20 can be integrated into the object 23 or data associated with the object, or otherwise associated with the object. For example, a physical tag, such as a bar code or RFID, may be affixed or built into an object. In some embodiments, the tag may be included in packaging or material associated with the object. A scan may use an integrated encoded tag 20 to generate scan data that may be used to identify the object and request one or more appropriate guides.

A user 24 may initiate an instruction manual request 25 via a mobile device (or other electronic device) 26. In this embodiment, user 24 may scan the object 27 to generate scan date 28. Scan data may include information for identifying the object 23 and/or the guide(s) to request. For example, mobile device 26 may receive scan data in the form of object and app data 28 from the scan. It should be understood that although the guide described in the embodiment shown is an instruction manual, other types of guides may be used as described above. After the device 26 receives scan data, one or more elements in the system (e.g., mobile device 26, server 15, web application 13) may analyze the scan data to identify the object 23 and/or determine the guide(s) to request.

Embodiments of the present invention may include a specific app on an electronic device to perform one or more of receiving scan data, analyzing scan data, and/or transmitting scan data or other information to request one or more guides. One of ordinary skill in the art should appreciate that one or more apps may be used for these features, and that other software (e.g., programs operating on the mobile device or other devices) may be used to perform all or a portion of these features. For example, some embodiments may use a feature of an electronic device to perform the object scan 27. In some embodiments, the object scan 27 may trigger the mobile device 26 to open targeted app 29. If targeted app 29 does not exist on the mobile device 26, then the mobile device 26 may, in some embodiments, automatically initiate a request to an app server 30, such as iTunes, based on a target app ID 31, to request transmission 32 of the targeted app 29 to be installed on the mobile device 26. With die targeted app 29 in place, the process shown in the embodiment of FIG. 2 can continue with the targeted app 29 sending the scanned object ID 33 to the server 15. In other embodiments, targeted app 29 may transmit other data, such as all or a portion of the scan data, or other data representing an analysis of the scan data and/or request for one or more guides. In some embodiments, the user 24 may be prompted to input additional data, such as a confirmation or selection input. The additional data may be included in the information transmitted in a request for a guide. Upon receipt of scanned object ID 33, server 15 may identify or selected the requested 3D model 16 and tasks 18 from the data stores. In some embodiments, server 15 may construct app-readable object data 34 for transmission and download by the targeted app 29 or another application on an electronic device, such as the mobile device 26. In this embodiment, targeted app 29 then translates the app-readable object data 34 for display as an interactive instruction manual 34 for the user 24. As described above, the interactive instruction manual 34 may be displayed on mobile device 26 or another electronic device. In some embodiments, user usage data 35 transferred via the targeted app 29 to the server 15, and stored 36 for subsequent analysis. The usage analytics 37 are then able to be delivered to the manager 11 via the web app 13. Other embodiments may perform user usage data receipt, storage, and analysis at different points in the system. For example, usage data 35 may be transferred directly to manager 11 in some embodiments. In some embodiments, usage data 35 may be collected from multiple sources, such as various users, one or more servers, etc., to provide broad data collection. Also, usage data 35 may be collected at different times, such as at the object scan 27, transmission of object ID 33, etc. Usage data 35 may include one or more of an aspect of the object scan 27, information about object 23 (e.g., serial number, model number, etc.), guide(s) requested, time spent using a guide, time spent on various portions of a guide, number of repeats of a portion of a guide, user feedback, etc. Generally, usage data 35 may include any data that may be useful or valuable to manager 11, such as for improving a guide and improving an object. Thus, in some embodiments, manager 11 may specify the contents of usage data 35.

Figure 3:
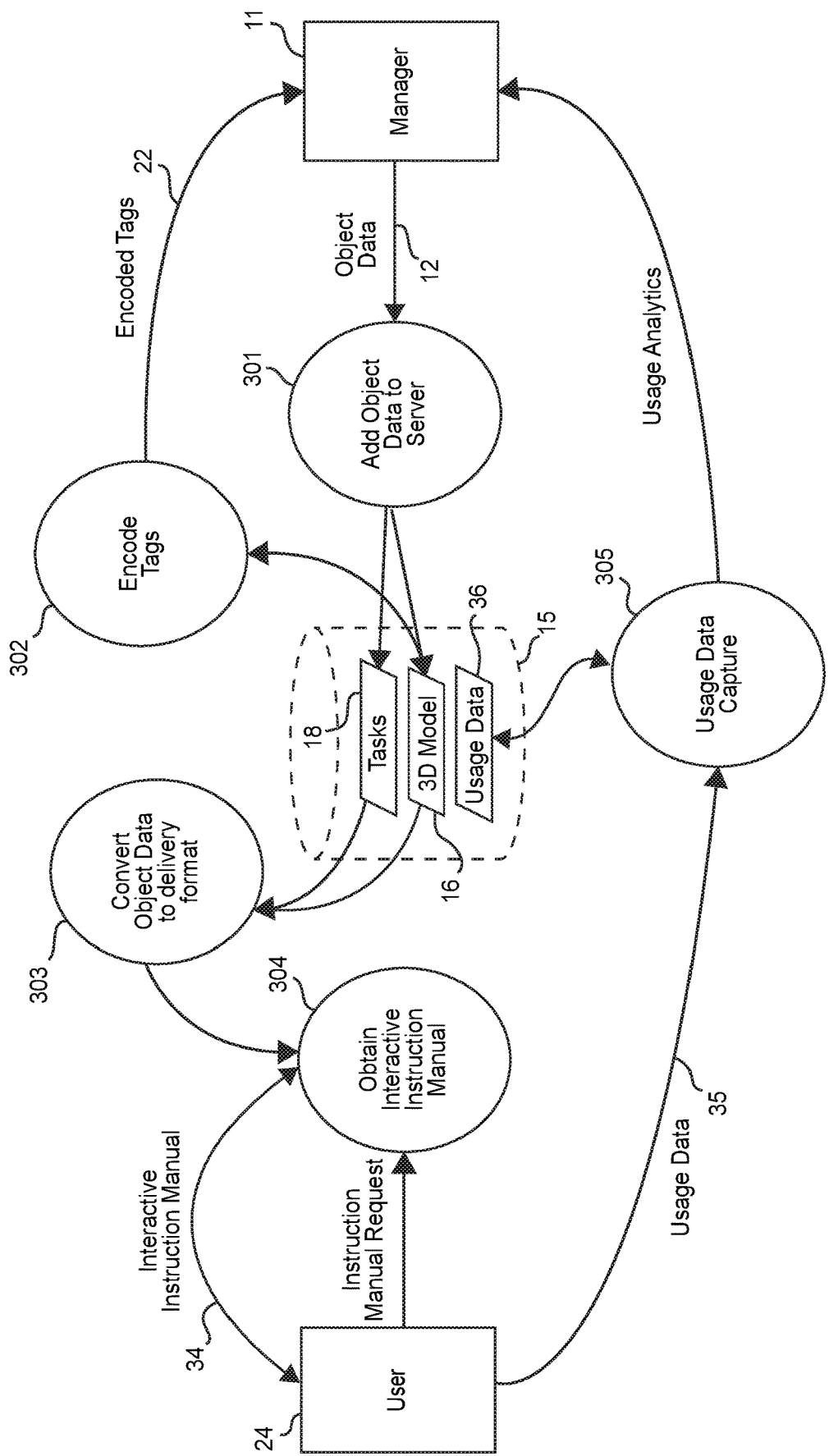
FIG. 3 shows the logical data flow for an embodiment of the present approach.

It should be appreciated from the foregoing that numerous logical flows may be used to implement the present approach. FIG. 3 shows the logical data flow for one embodiment. The first process in this embodiment is the "Add object data to server" process 301. This process enables a manager 11 with a guide for an object, such as a 3D model or other information for a guide, to input data to a server database 15 where the object data 15 may be used to provide interactive instruction manuals 34. The second core process is the encoding of tags 302. In this process, the manager 11 may establish the identification tagging for the object, and receive encoded tags 22 that can be integrated into the object. Encoded tags 22, may be physical tags, such as a bar code or QR code applied to an object or manual associated with the object. In some embodiments, an encoded tag 22 may be an RFID, Bluetooth device, or similar near-proximity signal. In some embodiments, an encoded tag may be a recognizable configuration of all or a portion of an object, such as a view of the object from a specific angle and approximate distance. In such embodiments, a targeted app may be configured to analyze an image captured by the mobile device to identify the tag.

After object data 12 has been loaded to a database 15 the server 15 may begin the "convert object data to delivery format" process 303. In process 303, a program operating on server 15 (or in some embodiments, other components of the system, such as on the manager side) converts object data 12 for use by various mobile applications, such as a targeted 29 on a user's mobile device 26. Processes 301, 3012, and 303 may be repeated as a manager 11 uploads object data 12 for more objects, multiple guides for an object, or updates/revises object data 12. With processes 301-303 complete, a user 24 can initiate the "Obtain Interactive Instruction Manual" process 304. This process 304 centers around the scanning of an object and/or one or more of any encoded tags associated with an object, and the receiving of the interactive instructional manual 34. In some embodiments, process 304 may be performed via a mobile device targeted application 29. Process 304 may also include elements relating to the capture of usage data 35 from users 24 of the interactive instruction manual. As described above, usage data 35 can range from registering a specific serial number to a user account to what training tasks and steps are most frequently requested and usage for a given object. In some embodiments, the usage data capture process may be a separate process 305. In some embodiments, process 305 may analyze collected data for desired metrics and outputs analyzed results back to the manager 11. It should be appreciated that the logical data flow shown in FIG. 3 represents one embodiment of the present invention, and that other logical data flows may be used consistently with the present approach.

Figure 4:
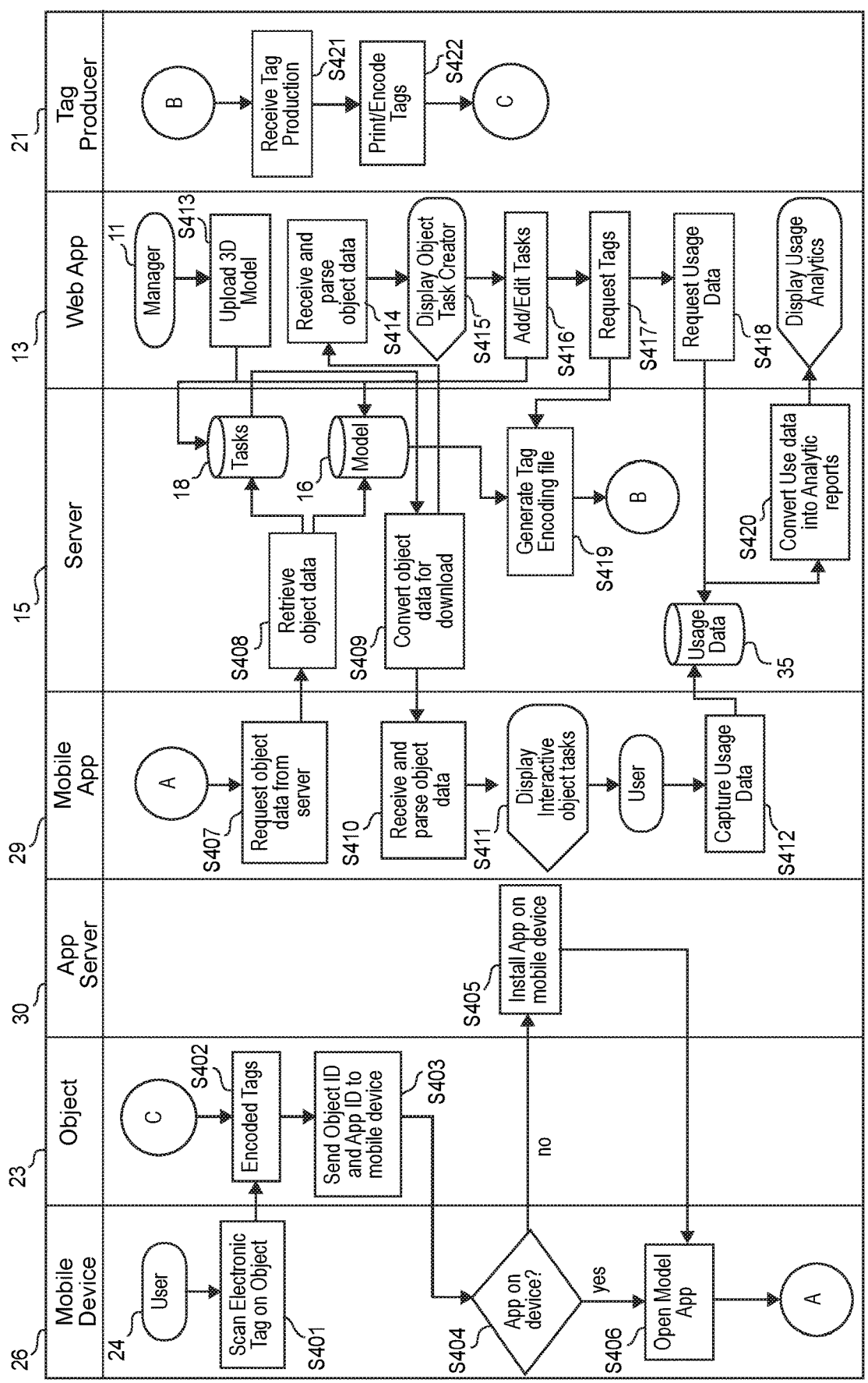
FIG. 4 is a series of flowcharts showing a process for providing interactive and three-dimensional manuals for a manufacturer's product, and for collecting related data thereto, according to an embodiment of the present approach.

Similarly, one of ordinary skill in the art should appreciate that the present approach may be practiced using one or more algorithms. FIG. 4 is a series of flowcharts showing embodiments of algorithms for providing interactive manuals for a manufacturer's product, and for collecting related data thereto. The flowchart in FIG. 4 shows the flow of data across various components in one embodiment: mobile device 26, object 23, app server 30, mobile app 29, server 15, web app 13, and tag producer 11. In this embodiment, user 26 scans an object for an electronic tag S401. As described above, there are many types of tags that may be used, and in some embodiments an image of the object or an aspect of the object may be used. Tags are provided S402, and transmitted in the form of an object ID and an App IP to the user's mobile device S405. In some embodiments, the targeted app may vary from one object to another. For example, a manufacturer may have a specific target application for certain objects. In some embodiments, the user's mobile device may receive scan data and determine the object ID and/or App ID. In some embodiments, a tag may include the object ID and/or App ID. After receiving an App ID, the user's device may determine whether the targeted application is present on the device S404. If not, the process may initiate a request to download and install the targeted app S405. If the targeted app is present, the mobile device may initiate a request to open the targeted app S406.

In step S407, the targeted app 29 may request a guide from server 15, such as an interactive instruction manual 25. In some embodiments, the targeted app 29 may request object data from server 15, and receive data from the server S410. From the received data, the targeted app may display the guide, such as a 3D model and associated tasks S411. In some embodiments, the mobile device may capture usage data S412, as described above.

As shown in FIG. 4, the manager 11 may upload object data 12 such as a 3D model S413. The object data 12 may be uploaded to a web app as described above, and in some embodiments may be uploaded to a server database. In some embodiments, server 15 translates object data 12 into model 16 and tasks 18, for other steps S409 and S419. In some embodiments, a web app or other process may prepare the guide for ultimate transmission. The manager 11 may receive and parse object data S414, and may use a task creator S415 to add, remove, and/or edit tasks and other elements of a guide S416. Manager 11 may further request tags S417 for the object relating to the guide associated with object data uploaded. In the embodiment shown, server 15 may respond by generating an encoded tag S419. In some embodiments, tags may be generated by the manager 11, or by another party, such as, for example, through an external vendor. In some embodiments, a tag may include data to identify au object from an image. Tags may be associated with an object, such as, for example, physically attaching a tag to an object, electronically associating a tag with an object, and/or associating image information with an object's identification. In some embodiments, a tag producer 21 may receive a tag production order S421, and prepare physical or electronic tags S422. After a user has requested a guide, manager 11 may in some embodiments request usage data S418. Generally, a manager 11 may use usage data 35 to improve an object, such as its manufacture or features, improve a guide, such as the clarity of tasks or usefulness of a 3D model, among other valuable uses. In some embodiments, server 15 may perform various analytics S420.

Figure 5:
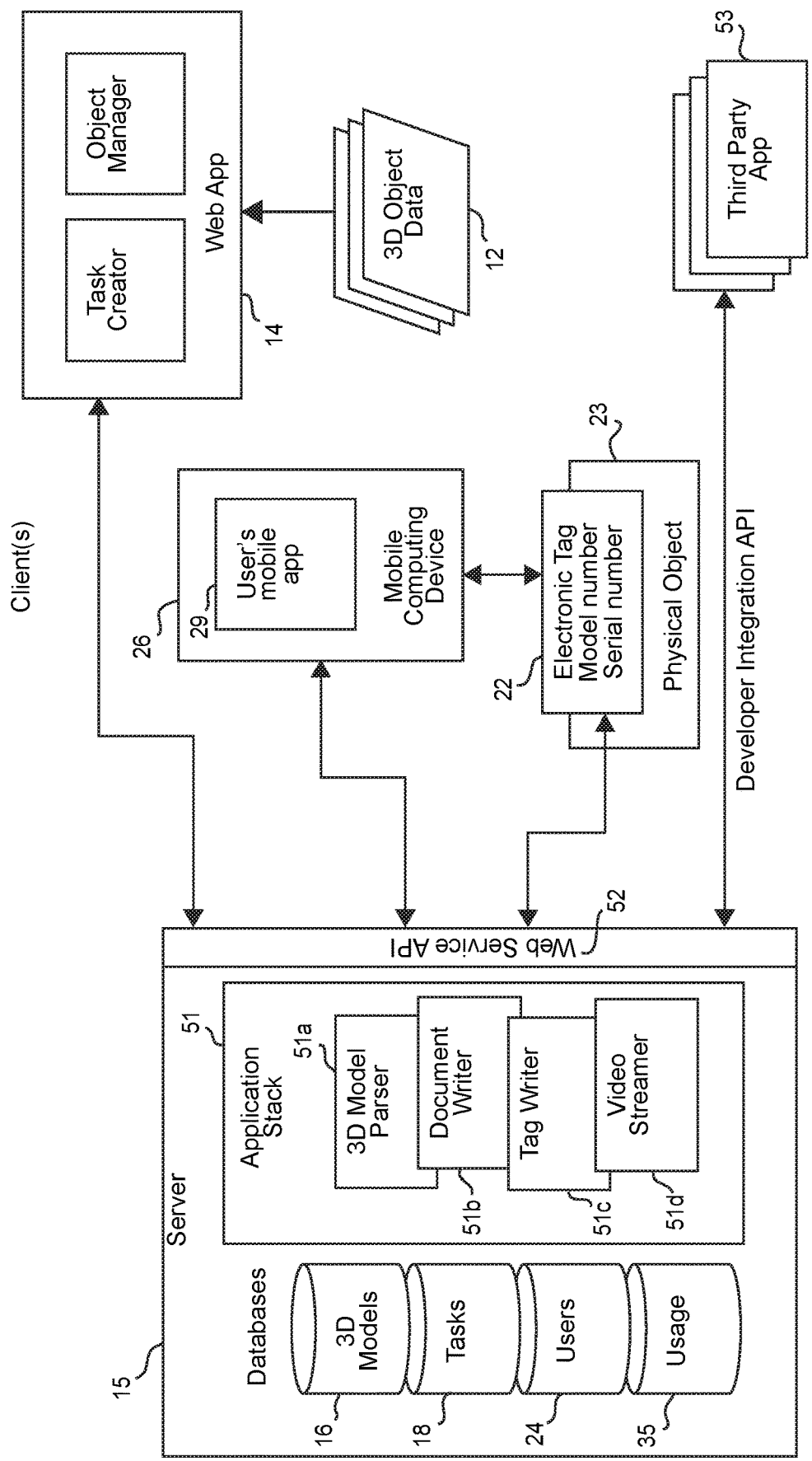
FIG. 5 shows an example of a hardware architecture according to an embodiment of the present approach.

FIG. 5 shows an example hardware architecture according to an embodiment of the present approach. A server 15 may include databases having 3D models 16, task data 18, user information 24, and usage data 35. In different embodiments, one or more of these databases may be maintained in a separate electronic device. Server 15 may also include various applications 51, such as, for example, a 3D model parser 51*a*, a document writer 51*b*, a tag writer 51*c*, and a video streamer 51*d*. Server 15 may also include a web service application programming interface 52.

An object 23 may include one or more tags, such as electronic tag 22 that identifies a model number and/or a serial number for object 23. As described above, a tag may be in many forms, such as physical or electronic, and an object may have more than one tag.

A user may have an electronic device, such as a mobile computing device 26 with a target app 29 as described above. A user may use more than one electronic device, such as, for example, a scanner to scan an object, a communications device to transmit scan data and/or make a request for a guide, and a display device for receiving and displaying a guide.

A manager may use an electronic device to provide object data 12, which may include 3D model data and one or more tasks associated with the guide. In some embodiments, a manager may interact with a system as described herein through a web app 14. In some embodiments, the server may provide secure web service APIs that can enable one or more third party applications 53 to utilize existing data stores for display within their customized client applications.

As will be appreciated by one of skill in the art, aspects or portions of the present approach may be embodied as a method, system, and at least in part, on a computer readable medium. Accordingly, the present approach may take the form of combination of hardware and software embodiments (including firmware, resident software, micro-code, etc.) or an embodiment combining software and hardware aspects that may all generally be referred to herein as a "circuit," "module" or "system." Furthermore, the present approach may take the form of a computer program product on a computer readable medium having computer-usable program code embodied in the medium. The present approach might also take the form of a combination of such a computer program product with one or more devices, such as a modular sensor brick, systems relating to communications, control, an integrate remote control component, etc.

Any suitable non-transient computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transient computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning; of the paper or other medium, then compiled, interpreted, or otherwise processed in a suitable manner, if necessary, and then stored in a computer memory. In the context of this document, a computer-usable or computer-readable medium may be any non-transient medium that can contain, store, communicate, propagate, or transport the program for use by or in connection with the instruction execution system, apparatus, or device.

Computer program code for carrying out operations of the present approach may be written in an object oriented programming language such as Java, C++, etc. However, the computer program code for carrying out operations of the present approach may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present approach is described below with reference to flowchart illustrations and/or block diagrams of methods, apparatus (systems) and computer program products according to embodiments of the approach. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable memory, including a networked or cloud accessible memory, that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to specially configure it to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present approach may be presented and responded to via a graphical User interface (GUT) presented on the display of the mobile communications device or the like. Prompts may also be audible, vibrating, etc. Any flowcharts and block diagrams in the Figures illustrate the architecture, functionality, and operation of possible implementations of systems, methods and computer program products according to various embodiments of the present approach. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the approach. As used herein, the singular forms "a," "an," and "the" are intended to include the plural forms as well, unless the context clearly indicates otherwise. It ill be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A system for disseminating electronic guides, the system comprising:
    a database having a 3D model repository with a plurality of 3D models, each 3D model associated with a physical object and an encoded tag, and a task repository having a plurality of tasks, each task associated with at least one physical object and at least one encoded tag, the task having instructions relating to the at least one physical object;
    an electronic guide generator configured to generate an electronic guide having at least one 3D model from the 3D model repository and at least one task from the task repository in response to receiving a generation instruction from an electronic guide distribution server;
    the electronic guide distribution server in electronic communication with the electronic guide generator and configured to receive from a first user electronic device a first encoded tag data associated with a first physical object, transmit a first generation instruction the electronic guide generator associated with the first encoded tag data, receive a first generated electronic guide from the electronic guide generator associated with the first physical object and the first encoded tag data, transmit the first generated electronic guide to the first user electronic device, and receive a first transmitted usage data from the first user device; and
    an electronic guide manager configured to improve the first generated electronic guide by at least one of adding a new task to the task repository and modify an existing task in the task repository in view of the first received usage data.

2. The system of claim 1, wherein the electronic guide distribution server is configured to receive from a second user electronic device a second encoded tag data associated with a second physical object, transmit a second generation instruction the electronic guide generator associated with the second encoded tag data, receive a second generated electronic guide from the electronic guide generator associated with the second physical object and the second encoded tag data, transmit the second generated electronic guide to the second user electronic device, and receive a second transmitted usage data from the second user device; and
    wherein the electronic guide manager is configured to improve the first generated electronic guide by at least one of adding a new task to the task repository and modify an existing task in the task repository in view of the first received usage data and the second received usage data.

3. The system of claim 2, wherein the electronic guide manager is configured to improve the second generated electronic guide by at least one of adding a new task to the task repository and modify an existing task in the task repository in view of the first received usage data and the second received usage data.

4. The system of claim 1, further comprising a plurality of user electronic devices, each user electronic device having:
    a scanner configured to scan an encoded tag on an object to generate the scan data including data associated with the encoded tag,
    a scan data transmitter configured to transmit scan data,
    an electronic guide receiver configured to receive an electronic guide having at least one 3D model and at least one task, and
    a display configured to display the received electronic guide and instructions for performing at least one physical manipulation of the at least one physical object associated with the at least one task;
    wherein each user electronic device is configured to transmit usage data to the electronic guide distribution server, the transmitted usage data relating to the use of a generated electronic guide, time using a generated electronic guide, and number of repeats of a portion of a guide.

5. The system of claim 1, wherein the first electronic guide comprises at least one model from the 3D model repository and a plurality of tasks from the task repository associated with the first physical object.

6. The system of claim 2, wherein the second electronic guide comprises at least one model from the 3D model repository and a plurality of tasks from the task repository associated with the second physical object.

7. The system of claim 1, wherein the first encoded tag data corresponds to an aspect of the first physical object, and the first generated electronic guide comprises at least one 3D model and at least one task associated with the first physical object.

8. The system of claim 2, wherein the second encoded tag data corresponds to an aspect of the second physical object, and the second generated electronic guide comprises at least one 3D model and at least one task associated with the second physical object.

9. The system of claim 1, wherein the electronic guide manager is configured to improve the first generated electronic guide by at least one of adding a new 3D model to the 3D model repository and modify an existing 3D model in the 3D model repository in view of first received usage data.

10. The system of claim 1, further comprising at least one encoded tag producer, the at least one encoded tag producer configured to generate new encoded tags associated with at least one physical object, at least one 3D model, and at least one task.

11. The system of claim 10, wherein the encoded tag producer is configured to apply a new encoded tag to new physical object.

12. The system of claim 10, wherein the encoded tag producer is configured to add to the database at least one of a new 3D model and a new task.

13. The system of claim 10, wherein the at least one electronic guide manager is configured to request a new encoded tag order from the at least one encoded tag producer after at least one of adding a new task to the task repository and modifying an existing task in the task repository.

14. The system of claim 1, wherein the 3D model repository comprises 3D model object data, and the electronic guide distribution server is configured to convert the 3D model object data into a delivery format, and transmit the 3D model delivery format to the user electronic device.

15. A system for disseminating electronic guides, the system comprising:
- a database having a 3D model repository with a plurality of 3D models, each 3D model associated with a physical object and an encoded tag, and a task repository having a plurality of tasks, each task associated with at least one physical object and at least one encoded tag, the task having instructions relating to the at least one physical object;
- an electronic guide generator configured to generate an electronic guide having at least one 3D model from the 3D model repository and at least one task from the task repository in response to receiving a generation instruction from an electronic guide distribution server;
- the electronic guide distribution server in electronic communication with the electronic guide generator and configured to receive from a first user electronic device a first encoded tag data associated with a first physical object, transmit a first generation instruction the electronic guide generator associated with the first encoded tag data, receive a first generated electronic guide from the electronic guide generator associated with the first physical object and the first encoded tag data, transmit the first generated electronic guide to the first user electronic device, and receive a first transmitted usage data from the first user device;
- an encoded tag producer configured to generate new encoded tags associated with at least one physical object, at least one 3D model, and at least one task; and
- an electronic guide manager configured to improve the database by at least one of adding a new task to the task repository and modifying an existing task in the task repository in view of the first received usage data.

16. The system of claim 15, wherein the electronic guide manager is configured to request a new encoded tag order from the at least one encoded tag producer after at least one of adding a new task to the task repository and modifying an existing task in the task repository.

17. The system of claim 15, wherein the electronic guide manager is configured to improve the database by at least one of adding a new 3D model to the 3D model repository and modify an existing 3D model in the 3D model repository in view of first received usage data.

18. The system of claim 17, wherein the electronic guide distribution server is configured to receive from a second user electronic device a second encoded tag data associated with a second physical object, transmit a second generation instruction the electronic guide generator associated with the second encoded tag data, receive a second generated electronic guide from the electronic guide generator associated with the second physical object and the second encoded tag data, transmit the second generated electronic guide to the second user electronic device, and receive a second transmitted usage data from the second user device.

19. The system of claim 18, wherein the electronic guide manager is configured to improve the first generated electronic guide by at least one of adding a new task to the task repository and modify an existing task in the task repository in view of the first received usage data and the second received usage data.

20. The system of claim 19, wherein the electronic guide manager is configured to improve the second generated electronic guide by at least one of adding a new task to the task repository and modify an existing task in the task repository in view of the first received usage data and the second received usage data.

* * * * *